United States Patent
Kivirauma et al.

(10) Patent No.: US 9,251,285 B2
(45) Date of Patent: Feb. 2, 2016

(54) METHOD, A SYSTEM AND A COMPUTER PROGRAM PRODUCT FOR SCORING A PROFILE IN SOCIAL NETWORKING SYSTEM

(71) Applicants: Donna Lynne Otzenberger Kivirauma, Kangasala as (FI); Kimmo Kivirauma, Kangasala as (FI)

(72) Inventors: Donna Lynne Otzenberger Kivirauma, Kangasala as (FI); Kimmo Kivirauma, Kangasala as (FI)

(73) Assignee: TEAMUP, OY (FI)

( * ) Notice: Subject to any disclaimer, the term of this patent is extended or adjusted under 35 U.S.C. 154(b) by 276 days.

(21) Appl. No.: 13/833,209

(22) Filed: Mar. 15, 2013

(65) Prior Publication Data

US 2014/0280209 A1   Sep. 18, 2014

(51) Int. Cl.
  *G06F 17/30* (2006.01)
  *G06Q 30/02* (2012.01)
  *G06Q 50/00* (2012.01)

(52) U.S. Cl.
  CPC ........ *G06F 17/3089* (2013.01); *G06F 17/3053* (2013.01); *G06F 17/30867* (2013.01); *G06Q 30/02* (2013.01); *G06Q 50/01* (2013.01)

(58) Field of Classification Search
  CPC .......... G06F 17/30867; G06F 17/3053; G06F 17/3089; G06Q 50/01; G06Q 30/02
  USPC ................................. 707/748, 758
  See application file for complete search history.

(56) References Cited

U.S. PATENT DOCUMENTS 8,135,800 B1    3/2012 Walsh et al.
8,332,512 B1 *  12/2012 Wu .................... G06Q 30/0254
                                                 705/319
2007/0038468 A1   2/2007 Walker
2010/0057517 A1   3/2010 Jerkins et al.
(Continued)

FOREIGN PATENT DOCUMENTS

WO   2012021576       2/2012
WO   2012162721 A1    6/2012
(Continued)

OTHER PUBLICATIONS

Yannopoulos, Peter, Celebrity Advertising: Literature Review and Propositions, Mar. 22, 2012, http://web.archive.org/web/20120322081559/http://www.wbiconpro.com/519-Peter.pdf.
(Continued)

*Primary Examiner* — Phong Nguyen
(74) *Attorney, Agent, or Firm* — Roy Kiesel Ford Doody & Thurmon

(57) ABSTRACT

A method, system and a computer program product for scoring a profile in a social networking system. The method comprises at least one Fan profile, at least one Talent profile and at least one Business profile, comprising a computer that has access to the social networking system. The computer is configured to receive information of the number of sharing actions the profile has introduced to the social networking system; receive information of the number of commercial actions the profile has executed in the social networking system; receive indication of interest from the profile, wherein each indication of interest is an action taken by the profile that shows that the profile has interest in the Talent profile or the Business profile; and calculate based upon the number of sharing actions and the number of commercial actions score metrics representing the profile's influence for the Talent profile or the Business profile.

19 Claims, 4 Drawing Sheets

(56) References Cited

U.S. PATENT DOCUMENTS

| | | | |
|---|---|---|---|
| 2011/0173570 A1* | 7/2011 | Moromisato | G06Q 10/10 715/838 |
| 2011/0320250 A1* | 12/2011 | Gemmell | G06Q 30/02 705/14.16 |
| 2011/0320373 A1* | 12/2011 | Lee | G06Q 50/01 705/319 |
| 2012/0030287 A1* | 2/2012 | Leonard | G06Q 10/10 709/204 |
| 2012/0047119 A1* | 2/2012 | Kandekar | G06F 17/30855 707/705 |
| 2012/0072572 A1 | 3/2012 | Bladel | |
| 2012/0072573 A1 | 3/2012 | Bladel | |
| 2012/0102027 A1* | 4/2012 | Zhu | G06Q 50/01 707/723 |
| 2012/0110071 A1 | 5/2012 | Zhou et al. | |
| 2012/0123867 A1 | 5/2012 | Hannan | |
| 2012/0158499 A1* | 6/2012 | Banadaki | G06Q 30/0254 705/14.52 |
| 2012/0185303 A1 | 7/2012 | Cesmedziev | |
| 2012/0191596 A1 | 7/2012 | Kremen et al. | |
| 2012/0239484 A1 | 9/2012 | Tobias et al. | |
| 2013/0031034 A1 | 1/2013 | Gubin et al. | |
| 2013/0097152 A1* | 4/2013 | Sommer | G06F 17/30979 707/722 |
| 2013/0173368 A1* | 7/2013 | Boutin | G06F 17/30283 705/14.16 |
| 2014/0082078 A1 | 3/2014 | Dunn et al. | |
| 2014/0108527 A1* | 4/2014 | Aravanis | G06Q 50/01 705/204 |
| 2014/0122234 A1* | 5/2014 | Wald | G06Q 30/0256 705/14.54 |
| 2014/0149213 A1* | 5/2014 | Fallatah | G06Q 30/0255 705/14.53 |

FOREIGN PATENT DOCUMENTS

| | | |
|---|---|---|
| WO | 2012166660 | 12/2012 |
| WO | 2012167115 | 12/2012 |
| WO | 2012167165 | 12/2012 |
| WO | 2013006654 | 1/2013 |

OTHER PUBLICATIONS

Creswell, Julie, Nothing Sells Like Celebrity, Jun. 22, 2008, http://www.nytimes.com/2008/06/22/business/media/22celeb.html?pagewanted=all&_r=1&.

Augusta Market at the River Sponsorship Benefits, Statistics and Application, Jun. 3, 2011, https://web.archive.org/web/20110603043456/http:/www.the augustamarket.com/sponsorship_application2.html.

Gray, Lauren K., Facebook Launches Promoted Posts, Pay as Little as $5 for More Fans to See Page Content, May 23, 2012, http://socialfresh.com/facebook-promoted-posts-go-live/.

Newman, Andrew Adam, Birthday Greetings From an "Idol" Contestant to Build the Brand, The New York Times, Mar. 23, 2011, http://www.nytimes.com/2011/03/24/business/media/24adco.html?_r=0.

Grant, Richard and Perman, Marc, Sports Marketing and Social Media, Los Angeles Daily Journal, Sep. 6, 2012, http://www.mcguirewoods.com/news-resources/publications/sports-marketing-social-media.pdf.

Rexrode, Christina, Twitter Celebrity Endorsements Are Big Business for Stars and Companies, Huffington Post Nov. 3, 2011, http://www.huffingtonpost.com/2011/11/03/celebrity-twitter-endorsements_n_1073577.html.

Kivirauma, Donna Lynne Otzenberger, U.S. Appl. No. 13/926,187, filed Jun. 25, 2013, entitled A Method, A System and a Computer Program Product for Scoring a Profile in Social Networking System.

* cited by examiner

| Use case | Shared_link_id Unique | Shared_by Unique Fan_id / Talent_id / Group_id / Busn_id / BusnTeam_id | Profile_type Fan / Talent / Group / Busn / BusnTeam | Profile_id | Shopitem_id Unique id within a shop | Offer_id Unique id within a BusnTeam |
|---|---|---|---|---|---|---|
| Fan1 shares Talent1's profile | 904d24576a87555a9804d9bde276a8f5 | Fan1 | T | T1 | NULL | NULL |
| Fan1 shares item t1 from Talent1's shop | ad7318c76b4659a83e484896265876695 | Fan1 | T | T1 | t1 | NULL |
| Fan1 shares Busn profile B1 | ee042c8f08336b820d7f92b5742b79a8 | Fan1 | B | B1 | NULL | NULL |
| Fan1 shares Business Team BT1 | f58e132cde448637b6c4d50563414a46 | Fan1 | BT | BT1 | NULL | NULL |
| Fan1 shares Offer O1 from Business Team BT1 | 3efec35972be8058764f47c3ca425abb | Fan1 | BT | BT1 | NULL | O1 |

Fig. 4

METHOD, A SYSTEM AND A COMPUTER PROGRAM PRODUCT FOR SCORING A PROFILE IN SOCIAL NETWORKING SYSTEM

FIELD OF THE INVENTION

The invention relates to social networking systems. More specifically, the invention relates to scoring a profile in a social network, where Fans, Talents and Businesses have interconnected profiles.

BACKGROUND OF THE INVENTION

Current social networking systems enable Businesses to communicate with Talents that they are sponsoring or Fans of the Talent. The problem with social media or social networks is that there are currently not sophisticated means to value the effect of a connection between the Business and the Talent or between the Talent and the Fan or the Business and the Fan. Examples of Talents are athletes, artists, musicians, sports clubs or similar entities, looking for sponsorship.

When a brand sponsors a Talent there is currently not a way to know who the people and businesses are that the sponsorship is targeted towards. There is not a way to gain a direct connection to the people and businesses connected to a sponsorship for marketing opportunities. There are no technical solutions available where a Fan can see how their social media sharing, merchandise and event purchases compare with other Fans of a particular Talent or Group.

One known solution is Facebook, where a Talent and a Business can set up a page. These pages are separate and do not work together to provide a marketing opportunity for the business. It also does not address the case for a business-to-business sales relationship. Once a business is able to gain a "like" on their social media page they can post a "status" but there is no guarantee that anyone will see it. The service provider may request a payment to gain extra visibility, but this still offers no guarantee of visibility and who actually is engaging with the "status" post. There is also no way to know, once a "like" is obtained, how influential that person or business is in bringing new likes to the business or talent.

Another problem in social networking systems is that there are too many things competing for space in the user's screen or timeline. As a result the marketing effect is diminished. User's use social networks mostly for personal sharing of information so any advertisements get easily discarded.

It is difficult for a Business to tell where Fans come from, for example which Talent or Fan attracted them to their business. It is also difficult for a Talent to know who his best fans are.

PURPOSE OF THE INVENTION

The purpose of the invention is to score a social network profile. The invention shows how to rank and reward a community member based on his/her contributions and actions related to another community member.

SUMMARY

The invention discloses a computer-implemented method for scoring a profile in a social networking system comprising at least one Fan profile, at least one Talent profile and at least one Business profile. In one example the profile to be scored is the Fan profile or the Talent profile. A computer has access to the social networking system and is configured to: receive information of the number of sharing actions the profile has introduced to the social networking system; receive information of the number of commercial actions the profile has executed in the social networking system; receive indication of interest from the profile, wherein each indication of interest is an action taken by a profile that shows that the profile has interest in the Talent profile or the Business profile; and calculate based upon the number of sharing actions and the number of commercial actions score metrics representing profile's influence for the Talent profile or the Business profile. In one example the indication of interest is received from the Fan profile. The score metrics represent in one embodiment the Fan profile's influence to the Talent profile and in one embodiment the Talent profile's influence to the Business profile.

In one embodiment the information of the number of sharing actions comprises the number of visitors following the link shared to the social networking system. The number is obtained for example by detecting the link usage metrics received from the web page service provider. In one embodiment information of the number of sharing actions comprises the number of new Fans that the profile, for example the Fan or the Talent profile, has introduced to the social networking system. The number of introduced new members is obtained for example by carrying the information of the profile sharing the link to the profile registration link. The number may be obtained also by the new member profile indicating the profile that shared the link or recommended the service.

In one embodiment information of the number of sharing actions comprises the number of items that were sold to other profiles as a result of sharing the item to the social networking system. For example the first Fan profile may have shared the item to another profile, which is not yet assigned to be a Fan profile or will become a new Fan after the sharing. The item is a product or a service. In one embodiment information of the number of commercial actions comprises the number of items purchased from the Talent or from the Business. The sharing or recommendation is indicated within the sales event. In one embodiment information of the number of commercial actions comprises the number of participations to events related to the Talent or to the Business. In one embodiment information of a commercial action is determined by receiving a unique code assigned to the item and comparing the unique code to the list of codes stored in the social networking system. For example, the information of the participation is determined by comparing a ticket number range received from the event organizer to the number received from the Fan.

The second aspect of the invention discloses a computer program product for scoring a profile in a social networking system comprising at least one Fan profile, at least one Talent profile and at least one Business profile, residing on a non-transitory processor-readable medium and comprising processor-readable instructions, which, when executed, cause a computer system to receive information of the number of sharing actions the profile has introduced to the social networking system; receive information of the number of commercial actions the profile has executed in the social networking system; and receive indications of interest from fans, wherein each indication of interest is an action taken by the profile that shows that the profile has interest in the Talent profile or the Business profile; calculate based upon the number of sharing actions and the number of commercial actions score metrics representing the profile's influence for the Talent profile or the Business profile.

The third aspect of the invention discloses a social networking system for scoring a profile comprising at least one Fan profile, at least one Talent profile and at least one Business profile, comprising a computer that has access to the social networking system, comprising at least one processor and memory storing instructions configured to instruct the at least one processor to: receive information of the number of sharing actions the profile has introduced to the social networking system; receive information of the number of commercial actions the profile has executed in the social networking system; receive indication of interest from the profile, wherein each indication of interest is an action taken by the profile that shows that the profile has interest in the Talent profile or the Business profile; and calculate based upon the number of sharing actions and the number of commercial actions score metrics representing the profile's influence for the Talent profile or the Business profiles.

The present invention provides technical solutions that would allow a Talent profile or Business profile or Group to find out the impact of the social media sharing of individual Fans that would tell the Talent how many new Fans are brought by a particular Fan or how many new sales happened because of a particular Fan. The invention also takes into account the activities such as attending events, buying items such as CDs, t-shirts, etc. The invention provides also a technical solution that shows the Talent or Group who their top fans are. It helps a Talent or Group sell merchandise or experiences to Fans and to enhance sponsorship opportunities for Businesses by giving a direct marketing channel to their Fans. The invention enables the scoring and ranking of profiles having specific roles. The roles of Fans, Talents and Businesses or groups formed of these have an influence that can be visualized to the user. The Fan can see how social media sharing, merchandise and event purchases compare with other Fans of a particular Talent or Group.

The embodiments of the invention described hereinbefore may be used in any combination with each other. Several of the embodiments may be combined together to form a further embodiment of the invention. A method, an apparatus, a system or a computer program to which the invention is related may comprise at least one of the embodiments of the invention described hereinbefore. It is to be understood that any of the above embodiments or modifications can be applied singly or in combination to the respective aspects to which they refer, unless they are explicitly stated as excluding alternatives.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 4 is a table illustrating different exemplary use cases according to the invention.

DETAILED DESCRIPTION OF THE INVENTION

Figure 1:
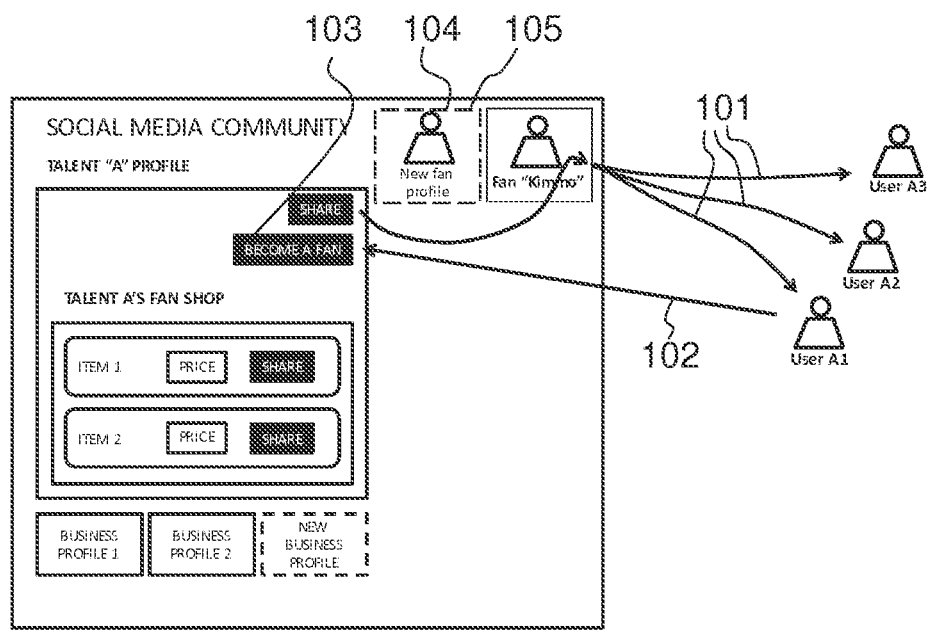
FIG. 1 is a block diagram illustrating an exemplary embodiment of the case where the first Fan, shares Talent's profile.

Reference will now be made in detail to the exemplary embodiments of the present invention, examples of which are illustrated in the accompanying drawings.

A social network system is an online service, platform, or site that focuses on facilitating the building of social networks or social relations among people who, for example, share interests, activities, backgrounds or real-life connections. The social network or social media comprises users with different roles or profiles. A profile may be considered in different roles in different contexts. According to the present invention, three profile types are introduced: a Fan, a Talent and a Business. At least two Talents form a Group. For this specification, the Fan or Fan profile already present in the social network community system is the first Fan and any new Fan or Fan profile is called the new Fan. This example does not limit the number of Fans in the social network or in the community. The community refers to the social network community system according to the present invention, comprising at least one interconnected Business, Talent and Fan profile. The social network service according to the present invention may comprise several interconnected Business, Talent or Fan profiles. The social network service may comprise a front page configured to be visualized as an Internet web page. The front page may comprise examples of Businesses or Talents and to indicate the reader of the web page some influential Businesses or Talents within the social network service.

The Talent or Group profile is part of the Business team profile. The Business Team refers to those profiles that are linked to the Business profile or receiving a sponsorship action executed by the Business profile. This enables a coordinated effort to market within a community. The invention takes into account actions and contributions made to a specific Talent or Group by providing a single point to link back to. The solutions according to prior art tell a Talent or Group how influential a person or the first Fan is in social media in general, but not what they are influencing people about. The present invention provides a more refined scoring and ranking solution.

The Fan profile's influence to the Business is indicated primarily via the Talent profile. The Business receives visibility by being available in the Talent's page. The Talent profile's influence to the Business can be measured by the visibility to the Fans, new Fans joining the community or Fans purchasing items from the Business or joining the Business community. The Business can get a recognizable marketing effect and a direct contact with Fans by endorsing a Talent.

When illustrating the importance of the first Fan for a Talent or Group, factors that may be taken into account are for example, how much the first Fan marketed a Talent or Group by sharing e.g. Fan shop items in social media and how successful were those sharing actions. Other factors are how much the first Fan purchase items and attend events of the Talent or Group from the Talent shop in the social community and outside the community. Based on collected information the system is able to calculate ranking in relation to other Fans of a Talent or Group.

The invention also illustrates how important the first Fan, Talent, Business, or Business Team is for the community. Factors include the identity and the number of new Fans that the first Fan introduced to the community. Another factor that may be included is the route via which Talents or Businesses acquired the new Fan. Another factor that may be included is the identity and the number of Talents the first Fan has introduced to the community and via which Talents or Businesses? Another factor that may be included is the identity and number of Businesses the first Fan has introduced to the community and via which Talents or Businesses. Based on collected information the system calculates ranking in relation to other Fans, Talents or Businesses in the community.

In the present social networks a person/group/business can have many followers/fans/supporters, but limited means to identify the most important ones. If a Talent has 5800 likes for his page in a social network service, he doesn't know which of those are the most loyal. Nor does he know which of them helped him to grow his Fan base the most. And he doesn't know which of them have supported him the most, combined financially and socially by sharing his profile and encouraging others to support him as well. The same problem may relate to the first Fan, not being able to know how to stand out from the crowd. The first Fan does not know how they rank amongst other Talent or Group's fans.

The present invention calculates a Fan score based upon the first Fan's activities in social media in regards to sharing a Talent or Group profile or item from the shop to their social media channels. The system scores the share and more importantly the influence of the person by taking into account also when someone clicks the link and subsequently joins the community, becomes a Fan of the Talent and also when the person or profile purchases something.

The present invention may also add to the Fan score points for activities that take place outside of the community such as attending an event or purchasing an item outside of the community, i.e. event ticket from another on-line service or item from another merchant. In practice, the Talent may ask the event organizer the range of ticket numbers they were selling for the event. The Talent or Business may then enter the range of ticket numbers to the community according to the invention, and the system could match the numbers in the list with the numbers Fans are typing when they want to prove that they were at the event. The Fan may be rewarded with some perks or benefits from the Talent, or Talent's sponsor.

Another embodiment for incorporating the ticket purchasing information to the community system or database is via an Application Programming Interface (API) to the community system according to the invention, which automatically imports the ticket purchase. The ticket purchasing system, e.g. Lippu.fi, allows for the community User_id or Fan_id to be entered into a field at the point-of-sale, so the information is transferred electronically to the community system.

The Talent or Group creates a profile within the social network community system. The Talent or Group may create a Fan shop as part of the profile to sell items and experiences. The first Fan also creates a profile to the social network community system, assigning to be a Fan of the Talent.

As an example, the first Fan is scored and ranked in relation to a particular Talent based upon the following system, illustrating the number of points the first Fan gets for each action:
  Become a Fan of the Talent: 1 point
  Share the Talent Profile in Social Media: 1 point
  Someone clicks on the profile link that was shared in the Fan Social Media channel: 3 points
  Someone clicks on the profile link that was shared in the Fan Social Media channel and becomes a Fan of the Talent: 10 points
  Share an item from the Fan Shop of a Talent in Social Media: 1 point
  Someone clicks on the item link that was shared in the Fan Social Media channel: 3 points
  Someone clicks on the item link that was shared in the Fan Social Media channel and becomes a Fan of Talent: 10 points
  Someone clicks on the item link that was shared in the Fan Social Media channel and purchases the item: 10 points
  Purchase an item from the Talent: 10 points
  Attend an event of the Talent: 10 points As a further example the Fan, Business and Talent gain specific community scores that affect the overall ranking of the Business profile or the Talent profile. This information is shown in the front page of the social network service, wherein the most influential Business profiles or Talent profiles are highlighted. Similar ranking may apply also within the Business profile's defined social community. The scoring is based on the following rules:
  Someone clicks on a shared link about a profile or Talent Fan shop or Sponsor shop item, and creates a new Fan profile: 10 points for "broughtFans"
  Someone clicks on a shared link about a profile or Fan shop or Sponsor shop item, and creates a new Business profile: 10 points for "broughtBusn"
  Someone clicks on a shared link about a profile or Fan shop or Sponsor shop item, and creates a new Premium Business profile: 10 points for "broughtBusnPrem"
  Someone clicks on a shared link about a profile or Fan shop or Sponsor shop item, and creates a new Business Team: 10 points for "broughtBusnTeam"

The scoring information is saved in the database related to each profile, so the community may receive the information about the first Fan, Talent, Business or Business Team that has grown the community the most.

When a Talent has an event outside of the social network community system, the Fans of the Talent can enter their unique ticket identifier into the community system to receive credit for attending the event. Alternatively, when a Fan purchases an event ticket or merchandise from a service other than the social network community system (e.g. online ticket service such as Lippu.fi) they can give their community user_id at the time of purchase to receive credit in the community for their purchase when the outside service is set-up to send information to the community electronically. Or alternatively, information received via e.g. Foursquare API about Fan's check-in to the event could be counted.

In one exemplary embodiment the social network community system compiles the scores for Fans of the Talent within the community. The community is configured to rank the first Fan for the Talent based on a high score to low score. The highest score receives the ranking of 1. The Talent is able to see the ranking of his Fans and detailed information of the activities that gave them that ranking. The Fan is able to see his ranking for a particular Talent as compared to other Fans of the Talent. The social community is configured to execute actions based on the ranking, for example the Talent can send messages to his top 15 fans.

One example comprises two Fans called "Kimmo" and "Donna". Since both Fans "Kimmo" and "Donna" earned 14 points related to Talent A, and that was the most anybody had, they share the "number one" position related to Talent A. Talent A can see the ranking of his Fans and act accordingly.

A User is defined in the social network community system as a person who has created at least one type of profile in the service according to the present invention: Fan profile, Business profile, or Talent profile. The user can create multiple profiles in the system. A unique identifier is used to differentiate the user. One example of unique identifier for the User_id is his email address.

A person who does not have a User_id in the system, is defined as a Visitor. A Visitor can be identified with e.g. web browser cookies.

The first Fan profile comprises at least a portion of the following information:
  A Fan_id, which is the unique identifier of the first Fan
  A User_id, which is the link to the user behind the profile Name (e.g. "Kimmo Kivirauma"), picture, textual description, links to other web sites Ids of other social media services (e.g. Facebook_id, Twitter_id, Googleplus_id) to get information such as how many followers the first Fan has, what are his latest tweets, who are his Facebook friends etc.

A list of Talent ids that he is a Fan of, e.g. {Talent_id1, Talent_id2}

A list of Business Teams that he is a member of, e.g. {BT_id1, BT_id2}

A list/table which shows the points earned related to each Talent he is a Fan of, e.g. {(Talent_id1, 100), (Talent_id2, 150)}

The Talent profile comprises at least a portion of the following information:

A Talent_id, which is the unique identifier of a Talent

A User_id, which is the link to the user behind the profile

Name of the Talent (e.g. "John Smith"), picture, home town, country, textual description, links to the other web sites A video identifier URL, (e.g. pointing to a Youtube URL)

Optional ids of other social media services (e.g. Facebook_id, Twitter_id, Googleplus_id) to get information such as how many Likes the Talent has in Facebook, how many followers the Talent has, what are his latest tweets, etc.

A list of the first Fan ids that are his Fans, e.g. {Fan_id1, Fan_id2}

A list of Talent ids that he is the first Fan of, e.g. {Talent_id1, Talent_id2}. The Talent can be the first Fan of other Talents as well.

A list of Business ids, that are supporting the Talent, e.g. {Busn_id1, Busn_id2}

A list of Business Teams that the Talent is a member of, e.g. {BT_id1, BT_id2}

A list/table which shows all the Fans the Talent has and how many points they have earned, e.g. {(Fan_id443, 10500), (Fan_id30, 9500), (Fan_id33, 8000), . . . (Fan_id604, 1)}. This list/table can be ordered so that the first one is always the one with the highest score. Thus, individual Fan's ranking related to this Talent can easily be illustrated by his position in the ordered list.

In one example the Talent profile is assigned as the shopkeeper to a Fan shop or to a Business shop, which consists of items for sale. Items in the shop have Shop_item_id, picture, description, price (either actual price with or without the VAT, or "ask for pricing"), availability (how many items available/out_of_stock), availability_until_date. In the case of Business shop, an item can also have a sponsor_me_to_your_team_flag.

The points table is assigned to Points_table in the social network community system. The system comprises a table which lists how many points are related to different actions and to which profile. An example of the table according to the invention:

| Act_id | Action | Points |
|---|---|---|
| BFT | Become a Fan of a Talent | 1 |
| STP | Share the Talent profile outside the community | 1 |
| Click | Someone clicks on the profile link that was shared by the first Fan | 3 |

-continued

| Act_id | Action | Points |
|---|---|---|
| ClickBFT | Someone clicks on the profile link that was shared by the Fan and becomes a Fan of a Talent | 10 |
| STPI | Share an item from the Fan shop of a Talent outside the community | 1 |
| STPIBFT | Someone clicks on the item link that was shared by the Fan and becomes a Fan of a Talent | 10 |
| STPIP | Someone clicks on the item link that was shared by the Fan and purchases the item | 10 |
| P | Purchase an item from the Talent | 10 |
| AE | Attend an event of the Talent | 10 |

The sharing in the social network community system contributes to an entry to a table keeping track of the profile (Fan/Talent/Business/Business Team) has shared which item (another profile/an item in the Talent shop/and offer in the Business Team).

The URL that is shared can take a form of e.g. http://www.teamup.fi/shared?=shared_link_id, where the shared_link_id can be generated using e.g. MD5 function with the input of all other values in the same row of the table. For instance, if the first Fan assigned as Fan1 shares Talent T1's profile, the following URL could be shared outside the social network community: http://www.teamup.fi/shared?=904d24576a87555d980d9bde276af8f5. The MD5 hash function from the combination of "Fan1,T,T1,NULL,NULL" equals "904d24576a87555d980d9bde276af8f5", as illustrated in FIG. 4, a table of different use cases.

When the visitor has clicked the URL, the "shared"-function of the web service queries the shared_link_table. When the shared_link_id-entry is found, the visitor is directed to the indicated page, based on the information stored in the table. For instance, if someone follows the URL http://www.teamup.fi/shared?=ad7318c76b4659a83e488962b5876695; he is brought to the Talent T1's shop to see item I1.

An exemplary embodiment of the case where the first Fan, "Kimmo" shares Talent T1's profile is illustrated in FIG. 1. In step 101 the first Fan, Fan1 shares Talent T1's profile in the social network community. The first Fan earns 1 point, as illustrated in the Points_table. The first Fan profile is also configured to operate with a list or table which shows the points earned related to each Talent he is Fan of (points_earned_table", the entry related to the Talent T1 is increased with 1 point.

In step 102 a person who does not have a membership or profile to the social network community clicks the link, and is directed to the community site, based on the Shared_link_table. The person is considered in the role of a Visitor, since there is no previously completed profile or the person is not signed in or registered to the service In step 103 the visitor decides to assign as a Fan for Talent T1 in the social network community. The service requests the Visitor to register as a new user and create a Fan profile, or alternatively let the Visitor sign in with the existing username. In both cases, the system temporarily stores the action "ClickBFT", as described in Points_table.

In step 104, if the Visitor creates a new Fan profile, and becomes a Fan of Talent T1, Fan1's points_earned_table's entry related to Talent T1 is increased with 10 points, as queried from Points_table for the temporarily stored "Click-BFT" action code. In this case the system can also register that Fan1 grew the community and reward him with similar procedure as with Points_table. This new Fan also gets 1 point as specified in the Points_table.

In step 105, if the Visitor signs in with an existing Fan profile, and becomes a Fan of Talent T1, Fan1's points_earned_table's entry related to Talent T1 is increased with 10 points, as queried from Points_table for the temporarily stored "ClickBFT" action code.

Calculating the number of points a Fan gets by purchasing items outside of the social network community is exemplified by a following scenario. The Talent has an event to which the tickets are only sold by external merchandise seller such as Lippu.fi. The Fan is rewarded for purchases in the social network community. The Talent sets up a specific item in the Fan shop. In this example the Talent's Fan shop comprises a link to an event seller outside the community. The Talent enters External_item_id code supplied by the outside Event ticket or merchandise seller (Seller) if the event ticket sales or merchandise sales is sent to the social network community via an API. If the process is manual then the social network service generates the Item_ID for manual entry of ticket sales or merchandise sales.

The item information is in one exemplary embodiment entered manually to the social network community system. The Talent receives from the Seller the ticket id range sold, e.g. 1-1000 or a list of ticket id's sold if the ticket id's are not sequential. Similarly, merchandise id codes may be received from the merchandise seller.

The social network community system creates a list of Items sold and the identities of Fans that have bought the Item and this initially assigns a "null" value for the Fan that has bought the Item. The first value is the Item Id that is automatically generated by the social network community system, the second is the Item number supplied by the Seller and the 3rd is the fan who bought the Item e.g. ((ITEM_ID267,ITEM_NBR1,NULL),(ITEM_ID267,ITEM_NBR2, NULL) . . . )

In the graphical representation of the user interface, next to the item in the Talent shop is a clickable button or a link indicating a text, "I purchased this." When the Fan clicks the button, a field is opened where the Fan can enter the item number related to the purchased item. The item number is verified by comparing it to the list previously generated. If numbers match, the Fan Id replaces the "null" value for that item. In addition this item is now added to the Fan ranking calculation and the Fan is given 10 points.

Figure 2:
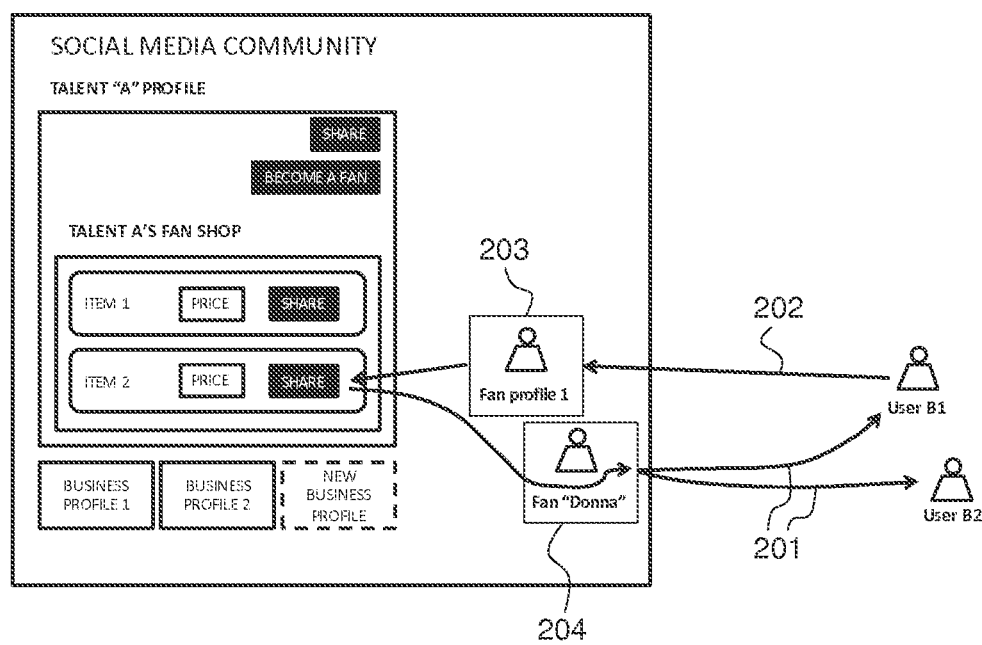
FIG. 2, is a block diagram illustrating of sharing an item with other Fans.

FIG. 2 illustrates an exemplary embodiment of sharing an item. The first Fan "Donna" shares an item comprising a link from Talent A's web shop to User B1 and User B2, arrows 201. The user B1 follows the link and enters the social network community, arrow 202. The user B1 has already a Fan profile in the social network community, so he may proceed to purchasing the item after signing in to the service or immediately if he has already signed in, arrow 203. The first Fan "Donna" receives 14 points related to Talent A, since she: shared an item in the Fan shop (1 point); user B1 clicked the link (3 points); and user B1 bought the item (10 points); arrow 204.

Figure 3:
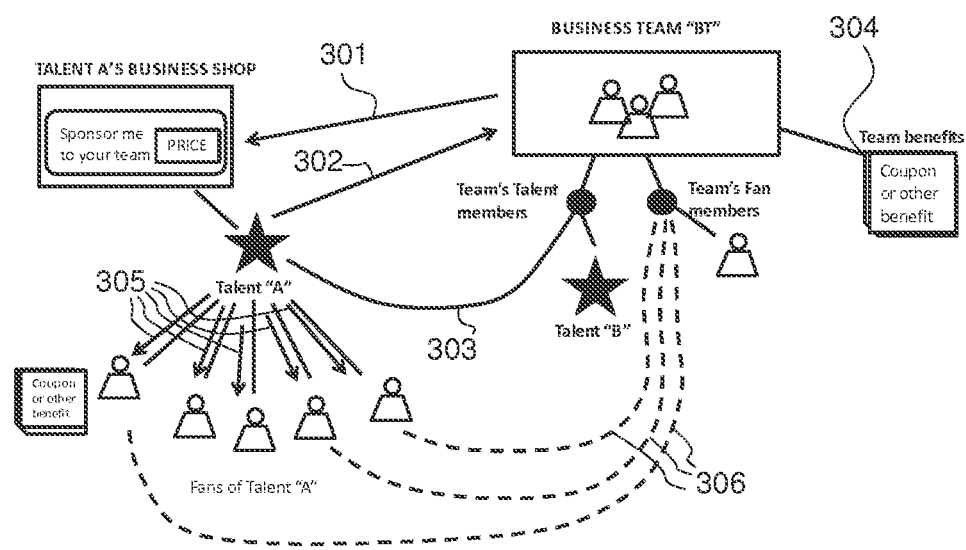
FIG. 3 is a block diagram illustrating the Business starting to sponsor a Talent and the effect of benefits produced to Fans.

Another exemplary embodiment is illustrated in FIG. 3. In this example the Business team "BT" expresses interest for joining as a sponsor to a Talent. This is executed for example by a purchase request for item "sponsor me to your team", arrow 301. The Talent has open items that enable the Business Team to become sponsors easily. In arrow 302 the Talent accepts the purchase request; + and in arrow 303 the Talent becomes a member of the business team. The Business team has a predefined message to be sent together with benefits for Fans of a new Talent joining the team, arrow 304. The request to join the Business team BT is sent to all Fans of the Talent. The Talent is the designated sender of the request on behalf of the Business team, arrow 305. All Fans who accept the request will become members of the business team and receive benefits, 306.

One embodiment of the invention provides an Application Programming Interface API, wherein tickets and items may be purchased from Service with API to the social network community system. The ticket and merchandise selling service (the Seller) provides the Talent or the community an ID for an Item they are selling for the Talent in the community. The Talent sets up an Item in the Fan shop for the Item that indicates it will be sold outside of the community. The Talent enters the Item ID provided by the Seller.

The Seller provides to the community system Items sold in its service for community members. The Seller provides a field in the ordering service for the community member to enter the user Id when purchasing the ticket or item. The Seller then provides the community with a list of Fans who have bought tickets from collecting the information from the ordering system. The list first indicates the event or item, then pairs with the Fan ID, e.g. ((Event_ID123,FAN_ID1), (Event_ID123, FAN_ID2) . . . )

When the community system receives the list from the Seller it triggers the purchase of this item by all of the Fans in the list. The first Fan's profile gains the information of the purchase of the Item. The addition to the profile is handled in a similar manner to how other items purchased from the Talent fan shop are handled and the first Fan receives 10 points for the purchase of this Item.

Embodiments of the present invention may be implemented in software, hardware, application logic or a combination of software, hardware and application logic. In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

If desired, the different functions discussed herein may be performed in a different order and/or concurrently with each other.

Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for scoring a profile in a social networking system comprising at least one Fan profile, at least one Talent profile and at least one Business profile, comprising a computer that has access to the social networking system and is configured to:
   receive information of the number of sharing actions the profile has introduced to the social networking system;
   receive information of the number of commercial actions the profile has executed in the social networking system;
   receive indication of interest from the profile, wherein each indication of interest is an action taken by the profile that shows that the profile has interest in the Talent profile or the Business profile; and
   calculate based upon the number of sharing actions and the number of commercial actions score metrics representing the profile's influence for the Talent profile or the Business profile.

2. The method according to claim 1, wherein information of the number of sharing actions comprises the number of visitors following the link shared to the social networking system.

3. The method according to claim 1, wherein information of the number of sharing actions comprises the number of new Fans that the profile has introduced to the social networking system.

4. The method according to claim 1, wherein information of the number of sharing actions comprises the number of items that were sold to other profiles as a result of sharing the item to the social networking system.

5. The method according to claim 1, wherein information of the number of commercial actions comprises the number of items purchased from the Talent or from the Business.

6. The method according to claim 1, wherein information of the number of commercial actions comprises the number of participations to events related to the Talent or to the Business.

7. The method according to claim 1, wherein information of a commercial action is determined by receiving a unique code assigned to the item and comparing the unique code to the list of codes stored in the social networking system.

8. A computer program product for scoring a profile in a social networking system comprising at least one Fan profile, at least one Talent profile and at least one Business profile, residing on a non-transitory processor-readable medium and comprising processor-readable instructions, which, when executed, cause a computer system to:
   receive information of the number of sharing actions the profile has introduced to the social networking system;
   receive information of the number of commercial actions the profile has executed in the social networking system; and
   receive indications of interest from fans, wherein each indication of interest is an action taken by the profile that shows that the profile has interest in the Talent profile or the Business profile;
   calculate based upon the number of sharing actions and the number of commercial actions score metrics representing the profile's influence for the Talent profile or the Business profile.

9. The computer program product according to claim 8, wherein information of the number of sharing actions comprises the number of visitors following the link shared to the social networking system.

10. The computer program product according to claim 8, wherein information of the number of sharing actions comprises the number of new Fans that the profile has introduced to the social networking system.

11. The computer program product according to claim 8, wherein information of the number of sharing actions comprises the number of items that were sold to other profiles as a result of sharing the item to the social networking system.

12. The computer program product according to claim 8, wherein information of the number of commercial actions comprises the number of items purchased from the Talent or from the Business.

13. The computer program product according to claim 8, wherein information of a commercial action is determined by receiving a unique code assigned to the item and comparing the unique code to the list of codes stored in the social networking system.

14. A social networking system for scoring a profile comprising at least one Fan profile, at least one Talent profile and at least one Business profile, comprising a computer that has access to the social networking system, comprising at least one processor and memory storing instructions configured to instruct the at least one processor to:
   receive information of the number of sharing actions the profile has introduced to the social networking system;
   receive information of the number of commercial actions the profile has executed in the social networking system;
   receive indication of interest from the profile, wherein each indication of interest is an action taken by the profile that shows that the profile has interest in the Talent profile or the Business profile; and
   calculate based upon the number of sharing actions and the number of commercial actions score metrics representing the profile's influence for the Talent profile or the Business profile.

15. The system according to claim 14, wherein information of the number of sharing actions comprises the number of visitors following the link shared to the social networking system.

16. The system according to claim 14, wherein information of the number of sharing actions comprises the number of new Fans that the profile has introduced to the social networking system.

17. The system according to claim 14, wherein information of the number of sharing actions comprises the number of items that were sold to other profiles as a result of sharing the item to the social networking system.

18. The system according to claim 14, wherein information of the number of commercial actions comprises the number of items purchased from the Talent or from the Business.

19. The system according to claim 14, wherein information of a commercial action is determined by receiving a unique code assigned to the item and comparing the unique code to the list of codes stored in the social networking system.

\* \* \* \* \*